(12) United States Patent
Liu et al.

(10) Patent No.: US 8,897,151 B2
(45) Date of Patent: Nov. 25, 2014

(54) SYSTEMATIC FRAMEWORK FOR APPLICATION PROTOCOL FIELD EXTRACTION

(75) Inventors: Xiang-Yang A. Liu, Okemos, MI (US); Chad R. Meiners, West Ford, MA (US); Eric Torng, East Lansing, MI (US)

(73) Assignee: Board of Trustees of Michigan State University, East Lansing, MI (US)

( * ) Notice: Subject to any disclaimer, the term of this patent is extended or adjusted under 35 U.S.C. 154(b) by 747 days.

(21) Appl. No.: 13/183,571

(22) Filed: Jul. 15, 2011

(65) Prior Publication Data
US 2012/0191833 A1      Jul. 26, 2012

Related U.S. Application Data

(60) Provisional application No. 61/365,079, filed on Jul. 16, 2010.

(51) Int. Cl.
*G06F 11/00* (2006.01)
*H04L 29/06* (2006.01)
*H04L 12/743* (2013.01)

(52) U.S. Cl.
CPC ........ *H04L 63/1416* (2013.01); *H04L 45/7457* (2013.01)
USPC ............... 370/252; 370/230; 370/466; 704/1; 704/10; 726/22; 726/23

(58) Field of Classification Search
USPC ........ 370/236, 474, 419, 252; 706/12, 48, 23; 726/11, 22–23, 25; 704/1, 10
See application file for complete search history.

(56) References Cited

U.S. PATENT DOCUMENTS

| | | | |
|---|---|---|---|
| 6,523,172 B1 * | 2/2003 | Martinez-Guerra et al. | 717/143 |
| 7,577,633 B2 * | 8/2009 | Shankar et al. | 706/48 |
| 7,962,323 B2 * | 6/2011 | Johnson et al. | 704/1 |
| 2008/0140589 A1 * | 6/2008 | Basu et al. | 706/12 |
| 2009/0070459 A1 * | 3/2009 | Cho et al. | 709/224 |

OTHER PUBLICATIONS

R. Smith et al, "XFA: Faster Signature Matching With Extended Automata", IEEE Symposium on Security and Privacy, May 2008.

* cited by examiner

*Primary Examiner* — Charles C Jiang
*Assistant Examiner* — Mohamed Kamara
(74) *Attorney, Agent, or Firm* — Harness, Dickey & Pierce, P.L.C.

(57) ABSTRACT

A computer-implemented system is provided for implementing application protocol field extraction. The system includes: an automata generator configured to receive the extraction specification that specifies data elements to be extracted from data packets and generate a counting automaton; and a field extractor configured to receive a data flow and operates to extract data elements from the data packets in accordance with the counting automaton. The extraction specification is expressed in terms of a context-free grammar, where the grammar defines grammatical structures of data packets transmitted in accordance with an application protocol and includes counters used to chronicle parsing history of production rules comprising the grammar.

16 Claims, 5 Drawing Sheets

SYSTEMATIC FRAMEWORK FOR APPLICATION PROTOCOL FIELD EXTRACTION

CROSS-REFERENCE TO RELATED APPLICATIONS

This application claims the benefit of U.S. Provisional Application No. 61/365,079, filed on Jul. 16, 2010. The entire disclosure of the above application is incorporated herein by reference.

FIELD

The present disclosure relates to a systematic framework for application protocol field extraction.

BACKGROUND

In the past, most network devices were content-unaware; such devices extracted only transportation information contained in Layer 3 (L3) and Layer 4 (L4) headers such as source IP address and destination port number instead of Layer 7 (L7) packet payload content to manage network traffic and implement network security. The main reason for using content-unaware networking devices is that it is much cheaper and easier to extract L3 and L4 packet header information than it is to extract L7 packet payload content.

However, modern network management now requires networking devices that can extract specific content from within packet payloads. A typical application will require these content-aware devices to extract particular L7 fields. For example, data loss prevention tools (DLP) often extract HTTP fields to detect covert data channels. Intrusion detection systems rely on L7 field extraction as a primitive operation. Load balancing devices may extract method names and parameters from flows carrying SOAP and XML-RPC traffic and then route the request to the appropriate server that is best able to respond to the request. Finally, existing network monitoring tools such as SNORT and BRO extract 1.7 fields for behavioral analysis.

The problem of online L7 field extraction that occurs within content-aware networking devices is addressed. To do this well, support is needed for automatic translation from grammar representations to automata implementations and automated optimization of the resulting automata implementations. Unfortunately, such automated translation and optimization is difficult because network protocols include features that are not easily represented using standard parsing models such as context-free grammars (CFGs) or regular expressions (Res). For example, the HTTP header field, "Content-Length", specifies the length of the HTTP body. Unaugmented, a CFG would require a new rule for each legitimate field length, which makes them impractical for L7 parsing.

Online L7 field extraction in a content-aware networking device is fundamentally different than end host protocol parsing because the content-aware network devices must handle millions of concurrent multiplexed network flows. This difference has several technical implications. First, buffering a flow before parsing should be avoided; thus parsing and field extraction should occur incrementally. Second, online L7 field extraction must support efficient context-switching; this requires the parsing state of flows to be minimized. Third, the online L7 field extraction must occur at line-speed.

Prior online L7 field extraction solutions suffer from one of two drawbacks. They are either hand optimized for better performance, or they are derived from an unoptimizable parsing model: recursive descent parsing with code execution. Hand optimized solutions suffer from a high production cost and are prone to errors. The recursive descent solutions offer an excessively rich parsing model that can not be automatically optimized.

Thus, there is no existing solution for online L7 field extraction that supports automated translation from a grammar-based extraction specification to an automata implementation with automated optimization. To illustrate one dimension where previous solutions struggle, the conflict between automated translation and optimization with line-speed extraction is highlighted. One technique that can be exploited to achieve line-speed extraction is to ignore (not parse) unnecessary data; referred to as selective parsing. Previous selective parsing work does achieve high throughput, but these solutions are achieved through hand pruning rather than automated translation and optimization.

This section provides background information related to the present disclosure which is not necessarily prior art.

SUMMARY

A computer-implemented system is provided for implementing application protocol field extraction. The system includes: an automata generator configured to receive the extraction specification that specifies data elements to be extracted from data packets and generate a counting automaton; and a field extractor configured to receive a data flow and operates to extract data elements from the data packets in accordance with the counting automaton. The extraction specification is expressed in terms of a context-free grammar, where the grammar defines grammatical structures of data packets transmitted in accordance with an application protocol and includes counters used to chronicle parsing history of production rules comprising the grammar.

In another aspect, a particular method is provided for transforming the extraction specification to an equivalent regular grammar. The method includes: identifying production rules from the extraction specification having nonterminals as either normal or non-normal; replacing each of the production rules identified as normal with a regular rule using decomposition methods; approximating a regular rule for each of the production rules identified as non-normal; and concatenating the regular rules to form a regular grammar. The method may further include eliminating any of the regular rules without terminal symbols from the regular grammar.

This section provides a general summary of the disclosure, and is not a comprehensive disclosure of its full scope or all of its features. Further areas of applicability will become apparent from the description provided herein. The description and specific examples in this summary are intended for purposes of illustration only and are not intended to limit the scope of the present disclosure.

DRAWINGS

Figure 1:
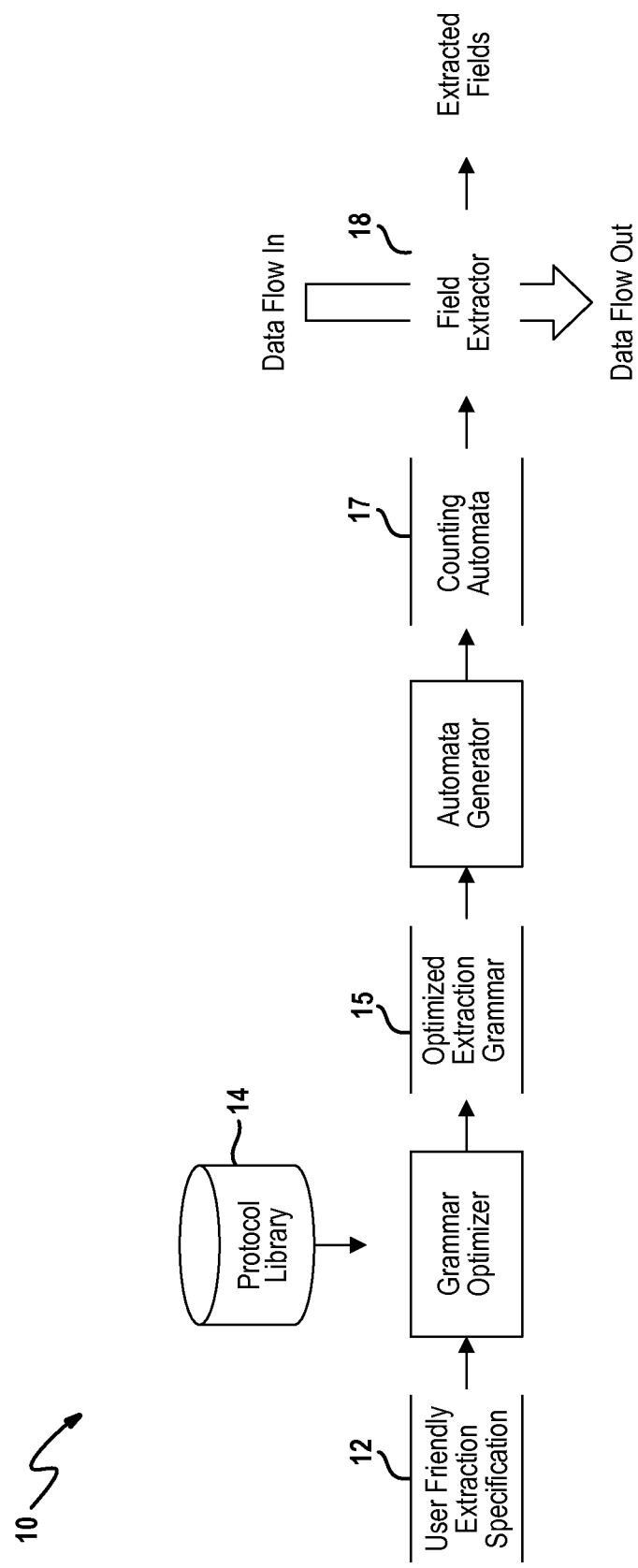
FIG. 1 is a diagram of an exemplary system for implementing application protocol field extraction.

The drawings described herein are for illustrative purposes only of selected embodiments and not all possible implementations, and are not intended to limit the scope of the present disclosure. Corresponding reference numerals indicate corresponding parts throughout the several views of the drawings.

DETAILED DESCRIPTION

FIG. 1 depicts an exemplary systematic framework 10 for application protocol field extraction (referred to herein as FlowSifter). The input to the framework is an extraction specification 12 that specifies the relevant protocol fields; that is, the extraction specification 12 specifies data elements to be extracted from data packets. The extraction specification 12 is expressed in terms of a context-free grammar, where the grammar defines grammatical structures of data packets transmitted in accordance with a given application protocol. The extraction specification can be a partial specification or a complete specification.

The FlowSifter framework 10 is comprised of three modules: a grammar optimizer 13, an automata generator 16 and a field extractor 18. As used herein, the term module may refer to, be part of, or include an application specific integrated circuit (ASIC); an electronic circuit; a combinational logic circuit; a field programmable gate array (FPGA); a processor that executes computer executable instructions; or other suitable components that provide the described functionality.

In operation, the grammar optimizer 13 receives the extraction specification 12 and outputs an optimized extraction grammar 15. When the extraction specification is incomplete, the grammar optimizer 13 interfaces with a corresponding complete protocol grammar residing in the protocol library 14 and operates to translate the extraction specification to a complete extraction specification using the complete protocol grammar.

The automata generator 16 receives the optimized extraction grammar and generates a counting automaton 17 which is a special type of finite automaton that is augmented with counters as further described below. The field extractor 18 in turn uses the counting automaton to extract relevant fields from data flows. In essence, the counting automaton serves as an L7 protocol configuration for the field extractor module.

The FlowSifter framework 10 recognizes that the automated translation and optimization of an online L7 field extractor requires grammar and automata models that are weaker than standard automata augmented with inline code but richer than finite state automata. Counting regular grammars (CRGs) and counting automata (CA) satisfy this requirement and address the other technical challenges. Because CA are state machines, they may be efficiently implemented in either software or hardware. Counting automatas have a fixed number of counters rather than a stack, so the parsing state size of any extractor is small and bounded. CRG based extractors are automatically derived from grammar specifications. By using counting context-free grammars (CCFGs) to define protocols and extractor specifications, the FlowSifter framework 10 automatically transforms grammar specifications into CRGs, which are executed as CA. For protocols that contain recursively nested fields, FlowSifter framework 10 uses an approximation method to generate a CRG that navigates the recursive structures of the protocol to locate and extract the desired L7 fields.

Given the difficulty of optimizing in-lined code segments, a parsing model is defined that augments rules for context-free grammars and regular grammars with counters, guards, and actions. These new grammar models are more expressive than their common counterparts, but they are still amenable to automatic simplification and optimization.

FlowSifter framework 10 produces an L7 field extractor from two inputs: a protocol specification and an extraction specification. Protocol specifications are CCFGs that precisely specify how to parse the network protocol. Protocol specifications are generic for any desired extraction and reused by multiple extraction specifications. Extraction specifications are written as annotated partial CCRGs. An extraction specification simply refers to the protocol specification for parts of the grammar that need no special handling. It specifies in detail the grammar rules that are required to extract the desired L7 fields.

Formally, a counting context-free grammar (CCFG) is a five-tuple $$\Gamma = (N, \Sigma, C, R, S)$$

where $N, \Sigma, C$, and $R$ are finite sets of nonterminals, terminals, counters, and production rules, respectively, and $S$ is the start nonterminal. The set of terminals includes an empty terminal, which we denote by $\epsilon$. A counter is a variable with an integer value, initialized to zero. The counters can be used to remember some parsing history such as the value of length fields. In parsing an HTTP flow, a counter is used to store the value of the "Content-Length" field. The counters also provide a mechanism for eliminating unbounded stacks.

A production rule is written as $$\langle \text{guard} \rangle : \langle \text{nonter min al} \rangle \rightarrow \langle \text{body} \rangle$$

The guard is a conjunction of unary predicates over the counters in C, i.e. expressions of a single counter that return true or false. An example guard is $(c_1 > 2; c_2 > 2)$, which checks counters $c_1$ and $c_2$, and evaluates to true if both are greater than 2. If a counter is not included in a guard, then its value does not affect the evaluation of the guard. An empty guard that always evaluates as true is allowed. Guards are used to guide the parsing based on "history" not encoded in the current state.

The nonterminal following the guard is called the head of the rule. Following it, the body is an ordered sequence of terminals and nonterminals, any of which can have associated actions. An action is a set of unary update expressions, each updating the value of one counter, and is associated with a specific terminal or nonterminal in a rule. The action is run after parsing the associated terminal or nonterminal. An example action in CCFG is $(c_1 := c_1 * 2; c_2 := c_2 + 1)$. If a counter is not included in an action, then the value of that counter is unchanged. An empty action which updates no counters is allowed.

Producing a language from a CCFG works in the same way as a leftmost derivation for CFG. Start with a body of the start non-terminal. At each step, first remove any actions before the leftmost nonterminal by running them in order. Then expand the leftmost nonterminal using a production whose guard evaluates to true. Repeating this procedure results in a string of nonterminals from our language. This leftmost derivation procedure matches the parsing semantics used herein.

With reference to the example set forth below, an application protocol feature that CFGs cannot easily represent can be easily specified with a Varstring language. The Varstring language consists of strings with two fields separated by a space: a length field and a data field, where the value of the length field specifies the length of the variable-length data field. A Dyck language CCFG is also presented; the Dyck language is the set of strings of balanced parentheses ']'. The adopted convention is that the head of the first rule is the start nonterminal.

$$S \rightarrow BV$$
$$B \rightarrow '\,0'(c := c*2)B$$
$$B \rightarrow '\,1'(c := c*2+1)B$$
$$B \rightarrow '\,\sqcup'$$
$$(c > 0): V \rightarrow \Sigma(c := c-1)V$$
$$(c = 0): V \rightarrow \varepsilon$$
(a) Varstring $\Gamma_v$ $$S \rightarrow \varepsilon$$
$$S \rightarrow IS$$
$$I \rightarrow '\,['S']'$$
(b) Dyck $\Gamma_d$ The six production rules in Varstring are explained. The first rule S→BV means that a message has two fields, the length field represented by nonterminal B and a variable length data field represented by nonterminal V. The second rule B→'0' (c:=c*2) B means that if the character '0' is encountered when parsing the length field, double the value of counter c. Similarly, the third rule B→'1'(c:=c*2+) B means that if '1' is encountered when parsing the length field, double the value of counter c first and then increase its value by 1. The fourth rule B→'␣' means that the parsing of the length field terminates when a space is encountered. These three rules fully specify how to parse the length field and store the length in c. For example, after parsing a length field with "10", the value of the counter c will be 2(=((0*2)+1)*2). The fifth rule (c>0): V→Σ(c:=c−1) V means that when parsing the data field, decrement the counter c by one each time a character is parsed. The guard allows use of this rule as long as c>0. The sixth rule (c=0):V→ε means that when c=0, the parsing of the variable-length field is terminated.

The CFGs that obey a regularity property are called regular grammars. Counting regular grammars (CRGs) are those CCFGs that obey a similar regularity property. For CRGs, all rules in the grammar must be one of the following two forms:

$$\langle\text{guard}\rangle: X \rightarrow \alpha[\langle\text{action}\rangle]Y \quad (1)$$

$$\langle\text{guard}\rangle: X \rightarrow \alpha[\langle\text{action}\rangle] \quad (2)$$

where X and Y are nonterminals and α∈Σ. CRG rules that fit equation 1 are the nonterminating rules; whereas, those that fit equation 2 are the terminating production rules as derivations end when they are applied. CCFG rules that fit either equation are regular rules; other rules are non-regular rules.

To build a CA field extractor, start with a CRG and yet do not force the user to give a strict CRG. The user can express the extraction specification as a CCFG and FlowSifter framework will transform it into an equivalent CRG. Any grammar that can be converted into an equivalent CRG is normal. The user's extraction specification CCFG is expressed as $$\Gamma_x = (N_x, \Sigma, C_x, R_x, S_x).$$

FlowSifter framework also does not require $\Gamma_x$ to be complete. That is, FlowSifter framework allows $\Gamma_x$ to refer to terminals and nonterminals specified in the L7 protocol's corresponding CGFG, which we refer to as $$\Gamma_p = (N_p, \Sigma, C_p, R_p, S_p).$$

However, $\Gamma_x$ is not allowed to modify $\Gamma_p$ without changing the semantics of $\Gamma_x$. To deal with the restrictions on grammars in practice, the user will submit their grammar and revise it based on feedback from the automatic analysis until it is deemed normal.

The purpose of the FlowSifter framework is to call application processing functions on user-specified fields. Based on the extracted field values that they receive, these application processing functions will take application specific actions such as stopping the flow for security purposes or routing the flow to a particular server for load balancing purposes. FlowSifter allows calls to these functions in the actions of a rule. Application processing functions can also return a value back into the extractor to change how it continues parsing the rest of the flow. Since the application processing functions are part of the layer above the FlowSifter framework, their specification is beyond the scope of this disclosure. Further, a shorthand is provided for calling an application processing function $f$ on a piece of the grammar:

$$f\{\langle\text{body}\rangle\}$$

where ⟨body⟩ is a rule body that makes up the field to be extracted.

Next, two user-friendly extraction specifications that are annotated partial CCFGs are as follows:

$$X \rightarrow Bvstr\{V\}$$
Varstring $\Gamma_{xv}$ $$X \rightarrow '\,[\,'parameter\{S\}'\,]'S$$
Dyck $\Gamma_{xd}$ The first, $\Gamma_{xv}$, specifies the extraction of the variable-length field V for the Varstring CCFG in the example above. This field is passed to an application processing function vstr. For example, given input stream "101Hello", the field "Hello" will be extracted. This example illustrates several features. First, it shows how the FlowSifter framework can handle variable-length field extractions. Second, it shows how the user can leverage the protocol library to simplify writing the extraction specification. While the Varstring protocol CCFG is not large, it is much easier to write a one production, incomplete CCFG $\Gamma_{xv}$ rather than a complete extraction grammar. The second extraction specification, $\Gamma_{xd}$, is associated with the Dyck CCFG in the example above and specifies the extraction of the contents of the first pair of square parentheses; this field is passed to an application processing function named parameter. For example, given the input stream [ [ [ ] ] ] [ [ ] [ ] ], the [ [ ] ] will be extracted. This example illustrates how the FlowSifter framework can extract specific fields within a recursive protocol by referring to the protocol grammar.

Operation of the FlowSifter framework is described in more detail. First, the FlowSifter framework 10 takes the potentially incomplete extraction CCFG $\Gamma_x$ and the L7 grammar $\Gamma_p$ and turns them into a complete extraction CRG $$\Gamma_f = (N_f, \Sigma, C_f, R_f, S_f).$$

Recall that $N_x$ and $N_p$ are disjoint and that $R_x$ may include nonterminals from $N_p$ only in the result of a production rule. Furthermore, the nonterminals in $N_x$ do not appear in any production rules in $R_p$. $N_x$ is referred to as the extraction nonterminals and $N_p$ as the protocol nonterminals.

For a given CCFG $\Gamma = (N, \Sigma, C, R, S)$, let $\Gamma(X)$ for $X \in N$ denote the grammar $(N, \Sigma, C, R, X)$; that is, X is the start nonterminal, and say that X is normal if $\Gamma(X)$ is normal. If all protocol nonterminals $Y \in N_p$ are treated as terminals in $\Gamma_x$, then assume that $\Gamma_x$ is normal. It follows that for each $X \in N_x$, X is normal if all protocol nonterminals are treated as terminals. However, it is possible that some protocol nonterminal $Y \in N_p$ that is reachable from $S_x$ is not normal. For example, $\Gamma_p(Y)$ may define a feature such as nesting of balanced opening and closing parentheses that require unlimited memory to precisely parse. Therefore, the FlowSifter framework combines $\Gamma_x$ with $\Gamma_p$ to produce a CRG.

Figure 2:
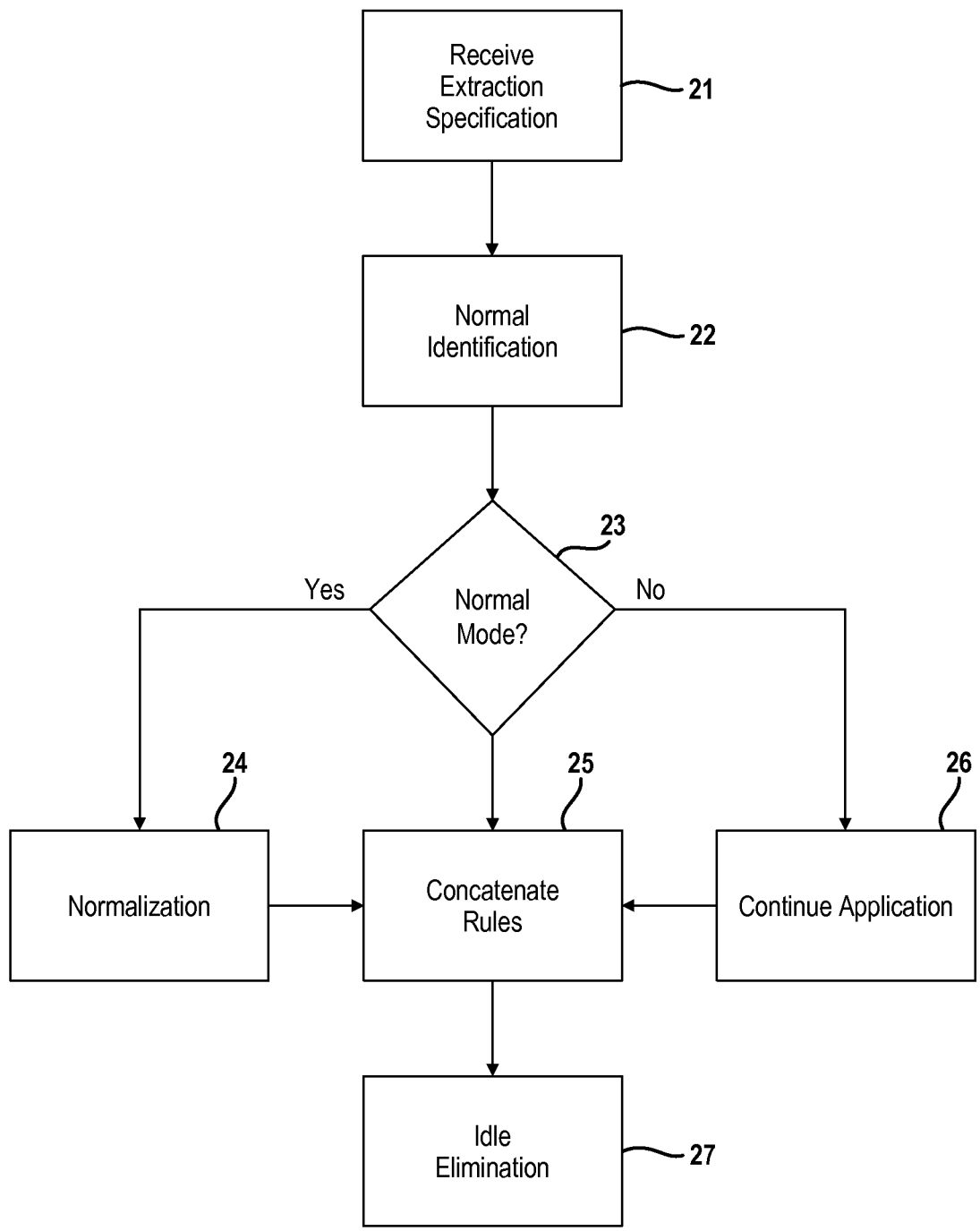
FIG. 2 is a flow diagram depicting an exemplary method for transforming an extraction specification into an equivalent regular grammar.

With reference to FIG. 2, the FlowSifter framework 10 automatically produces an optimized CRG extraction grammar form the extraction grammar and the corresponding CFG. First, the production rules from the extraction specification having nonterminals are identified at 22 as either normal or non-normal. Each of the production rules identified as normal are replaced at 24 with a regular rule using conventional decomposition methods. Conversely, each of the production rules identified as non-normal are approximated at 26. In either case, the resulting regular rules are concatenated at 25 to form a regular grammar. Lastly, idle elimination at 27 removes rules that do not consume input. After applying all these processes, the input CCFGs are converted into a CCFG with regular rules (a CRG), which is suitable for conversation into a CA. Each of these steps are further described below.

Determining if a context free grammar describes a regular language is undecidable. Thus, we cannot precisely identify normal nonterminals. FlowSifter identifies nonterminals in $N_p$ that are guaranteed to be normal using the following sufficient but not necessary condition. Each nonterminal $X \in N_p$ is normal if
1. $\Gamma_f(X)$ is regular OR
2. For all rules with head X,
   (a) X only appears last in the body AND
   (b) for every Y that is reachable from X
      i. Y is normal AND
      II. X is not reachable from Y.

That is, FlowSifter first checks to see if $\Gamma_f(X)$ is regular. If so, it stops and returns that X is normal. Otherwise, it checks each production rule with head X to confirm that if X appears, X is the last symbol in the body. If X appears in a non-final position, FlowSifter decides that it is not normal, even though it may be. Otherwise, FlowSifter finally recursively performs the normal check on any other nonterminals that are reached. When performing these recursive checks, if FlowSifter reaches X again, FlowSifter decides that X is not normal, even through it might be. If any nonterminal that is checked in the process is determined to be not normal, FlowSifter decides that X is not normal, even though it might be. Otherwise, FlowSifter decides that X is normal.

Once FlowSifter has identified each nonterminal as regular or not, the normal nonterminals are normalized; whereas, the non-normal nonerminals are approximated. Since the process for identifying nonterminals is not accurate, a normal nonterminal may be misidentified as not normal. Fortunately, the cost of such a mistake is relatively low; it's only one counter in memory and some unnecessary predicate checks.

Normalization replaces a normal nonterminal's rules with a collection of equivalent regular rules. The basic idea behind normalization is to use standard decomposition techniques to turn nonregular rules into a collection of equivalent regular rules. Consider an arbitrary nonregular rule $\langle guard \rangle : X \rightarrow \langle body \rangle$.

First express the body as $Y_1 \ldots Y_n$, where $Y_i, 1 \leq i \leq n$ is either a terminal (possibly with an action) or a nonterminal. Because this is a nonregular rule, either $Y_1$ is a nonterminal or n>2 (or both). Handle the cases as follows:

If $Y_1$ is a non-normal nonterminal, $\Gamma_x$ was incorrectly written and needs to be reformulated If $Y_1$ is a normal nonterminal, use the assumed CRG $\Gamma' = (N', \Sigma, C', R', S')$ that is equivalent to $\Gamma_f(Y_1)$ to replace the rule as follows. First, add rule $\langle guard \rangle : X \rightarrow S'$. Next, for each terminating rule $r \in R'$, append $Y_2 \ldots Y_n$ to the body of r and the resulting rule to the normalized rule set. Finally, add all the nonterminating rules $r \in R'$ to the normalized rule set.

If $Y_1$ is a terminal and n>2, the rule is decomposed into two rules: $\langle guard \rangle : X \rightarrow Y_1 X'$ and $X' \rightarrow Y_2 \ldots Y_n$ where X' is a new nonterminal.

For example, consider the Varstring CCFG $\Gamma_v$ with non-regular rule $S \rightarrow BV$. Both $\Gamma_b(B)$ and $\Gamma_v(V)$ are CRGs. Decomposition normalizes $\Gamma_v(S)$ by replacing $S \rightarrow BV$ by $S \rightarrow B'$ and $B' \rightarrow \sqcup$ by $B' \rightarrow V$. Also, add copies of all other rules where B' is used in place of B. This result is illustrated below.

$S \rightarrow B'$ $B' \rightarrow 0(w:=w*2)B'$ $B' \rightarrow 1(w:=1+w*2)B'$ $B' \rightarrow \sqcup V$ $B \rightarrow 0(w:=w*2)B$ $B \rightarrow 1(w:=1+w*2)B$ $B \rightarrow \sqcup$ $(w=0):V \rightarrow \epsilon$ $(w>0):V \rightarrow \Sigma(w:=w-1)V$ Note that the nonterminal B is no longer referenced by any rule in the new grammar. For efficiency, unreferenced nonterminals are removed and their rules after each application of decomposition.

Counting approximation is used to produce regular rules for L7 protocol structure that are not normal. The basic idea is to parse only the start and end terminals for $\Gamma(X)$ ignoring any other parsing information contained within this subgrammar. By using the counters to track nesting depth, we can approximate the parsing stack for nonterminals in the protocol grammar. We only apply this to nonterminals from $N_p$, so we don't affect extraction on grammatical streams.

Given a CCFG $\Gamma_f$ with a nonterminal $X \in N$, that does not identify as normal, FlowSifter computes a counting approximation of $\Gamma_f(X)$ which are denoted as start and stop. These are the terminals that mark the start and end of a string that can be produced by $\Gamma(X)$. The remaining terminals we denote as other. For example, in the Dyck extraction grammar $\Gamma_{xd}(S)$ are $\{\text{'['}\}$ and $\{\text{']'}\}$, respectively, and other has no elements. FlowSifter replaces all rules with head X with the following rules that use a new counter cnt:

$(cnt=0):X \rightarrow \epsilon$ $(cnt \geq 0):X \rightarrow start(cnt:=cnt+1)X$ $(cnt>0):X \rightarrow stop(cnt:=cnt-1)X$ $(cnt>0):X \rightarrow other\ X$ The first rule allows exiting X when the recursion level is zero. The second and third increase and decrease the recursion level when matching start and stop terminals. The final production rule consumes the other terminals, approximating the grammar while cnt>0.

For example, if we apply counting approximation to the nonterminal S from the Dyck extraction grammar $\Gamma_{xd}$ above, the resulting new production rules are as follows.

(cnt=0)$S \rightarrow \epsilon$ (cnt 0)$S \rightarrow$ '['(cnt:=cnt+1)$S$ cnt>0)$S \rightarrow$ ']'(cnt:=cnt-1)$S$ Counting approximation can be applied to any subgrammar $\Gamma_f(X)$ with unambiguous starting and stopping terminals. Ignoring all parsing information other than nesting depth of start and end terminals in the flow leads to potentially faster flow processing and fixed memory cost. Most importantly, these errors introduced do not interfere with field extraction because we do not approximate extraction specification nonterminals.

The final step to producing a CRG is to remove any rules without terminal symbols. This guarantees that every derivation consumes input. Such rules are called idle rules, and they have the form: $X \rightarrow Y$ without any terminal $\alpha$. Idle rules are eliminated by hoisting the contents of Y into X. We must also compose the actions and predicates. For a CRG with n variables, to compose a rule $(q_1 \wedge \ldots \wedge q_n):Y \rightarrow \alpha(act)(g_1, \ldots, g_n)$ into the idle rule $(p_1 \wedge \ldots \wedge p_n):X \rightarrow Y(f_1, \ldots, f_n),$ we create a new rule $(p_1' \wedge \ldots \wedge p_n'):X \rightarrow \alpha(act)Z(f_1', \ldots, f_n')$ where $p_i'=p_i \wedge q_i$ and $f_i'=f_i \circ g_i$ for $1 \leq i \leq n$. That is, compose the actions associated with Y in X into Z's actions and merge the predicates.

The automata generator module 16 takes an optimized extraction grammar as its input and generates an equivalent counting automaton, which will serve as the data structure (or say the "configuration") of the field extractor module 18. Counting Automata (CA) allow efficient use of CRGs in online field extraction by leveraging deterministic finite state automata (DFA) for matching flow data. Much work has been done on efficient implementation of DFAs on network and security devices. This work is built upon by using regular expressions as the terminal symbols in our CCFGs and CRGs. This implies that each transition in the resulting CA uses its own DFA to process the flow payload, determine the next CA state, and update the CA counters.

First, define a DFA with labeled decisions. A Labeled DFA is a 5-tuple $DFA(\Sigma,D)=(Q,\Sigma,\delta,q_0,DF)$ where Q is a set of states, $\Sigma$ is an alphabet, $q_0$ is the initial state, $\delta:Q \times \Sigma \rightarrow Q$ is the transition function and $DF:Q \rightarrow D$ is a partial function assigning a subset of the states a decision from the decision set D. The notation $DFA(\Sigma,D)$ denotes the set of DFA over an alphabet $\Sigma$ and a decision set D. A Counting Automata (CA) is a 5-tuple $(Q,\Sigma,C,\delta,q_0,c_0)$ where $Q_c$ is a set of states, $\Sigma$ is an alphabet, C is a set of possible counter configurations, $q_0$ is the initial state, and $c_0$ is the initial counter configuration. The transition function is $\delta:Q \times C \rightarrow DFA(\Sigma,(Q \times (C \rightarrow C)))$; that is, given the current state $q_j \in Q$ and an action function act, that updates the counter configuration.

FlowSifter generates a CA $(Q,\Sigma,C,\delta,q_0)$ from a CRG $\Gamma=(N,\Sigma_g,C_g,R,S)$ as follows. Some components of the grammar are directly inherited by the CA. The states of the CA are exactly the set of nonterminals of the CRG, and the initial state is also the start nonterminal, so Q=N and $q_0$=S. The CA also works over the same alphabet as the grammar, so $\Sigma=\Sigma_g$. For the set of possible counter configurations C, assume each counter from $C_g$ has some maximum size, typically $2^{sizeof(int)}-1$. We could reduce the size of each counter to reduce the final parsing state size of the CA. Formally C={$(c_1,c_2, \ldots, c_{|C_g|}):|c_i|<2^{sizeof(int)}, 1 \leq i \leq |C_g|$}. The most complex assignment is the transition function $\delta$. For each state q, consider the corresponding nonterminal X. For each possible counter configuration $c \in C$, we identify the set of production rules $r(c) \in R$ with head X whose guards are satisfied by c. The body of each rule $r_i \in r()$ consists of a regular expression $rx_i$ (the terminals in the CRG are regular expressions), an action $act_i$ which updates some of the counters, and possibly a next nonterminal $nt_i$. For this q and, construct a DFA built from the $rx_i$ of the rules $r_i \in r(c)$. The decision for each $rx_i$ is ($act_i,nt_i$).

To apply a CA to a flow, first identify $\delta(q_0,c_0)=df \alpha_0$ and run this DFA on the flow until it returns a decision ($q_1,act_0$). If the DFA does not return any decision, the flow does not match the grammar, and processing is stopped. The action function $act_o$ is applied to get the new counter configuration $c_1=act_0(c_0)$. Then identify the appropriate DFA $\delta(q_1,c_1)=df \alpha_1$ which resumes processing the flow. The CA continues in this fashion alternating between CA states where counters are updated and predicates computed and DFA states where flow input is consumed until the entire flow is processed. The parsing state of the CA consists of a DFA state, a counter configuration, plus some flow state variables such as the flow offset that the next DFA should start at.

A CA reports extraction events by having its actions call application processing functions which are defined in the extraction specification. The CA waits for a return value from the called application processing function so it can complete updating the counters before it continues processing the input flow. In many cases, the application processing function never needs to return an actual value to the CA, so it can immediately return a null value so that the CA can immediately resume processing the input flow.

The description above has assumed that only one regular expression from the rules in r(c) will match the flow data at a time. However, multiple regular expressions may match the same flow data and have different actions. This is addressed by assigning priorities to the different rules in r(c) and take these priorities into account when constructing the DFA that corresponds to $\delta(X,c)$. For example, use HEADER → /(?i:Content-Length):\s*/
[bodylength := getnum( )];
HEADER 99 → token / : / VALUE;

as part of our protocol specification for processing HTTP headers. We give the first rule higher priority which allows us to easily match the special case of TOKEN where the header name is "Content-Length" and do a different action.

To call an application processing function, we need to give it the positions of the extracted field within the stream. Thus, we need a pos ( ) function that returns the current position in the input flow, and the actions need access to such functions and flow state variables in the parsing state so that they can put the offset of the start of the field into a counter.

One optimization we have implemented is to allow actions to modify the flow offset in the parsing state. Specifically, if we are processing an HTTP flow and do not need to parse within the body, the actions increase the offset by the value in the HTTP content-Length field rather than use the DFA to parse through the body byte by byte.

Another optimization we have implemented eliminates some DFA to CA transitions. Suppose the optimized CRG has a nonterminal X with a single rule with no actions such as X→|rx|Y. We can save the switch from DFA to CA at the end of /rx/ and the switch back to DFA at the beginning of Y by inlining Y into X, as idle rule elimination, except we prepend /rx/ to the beginning of each of Y's terminal symbols. We also perform this optimization when Y has a single rule and all of X's rules that end in Y have no actions. This increases the complexity of the DFAs for each non-terminal but improves parsing speed.

Field extractor performance is evaluated in three areas: speed, memory and extractor definition complexity. Speed is important to keep up with incoming packets at the speed of the interface. Because memory bandwidth is limited and saving and loading extractor state to DRAM is necessary when parsing a large number of simultaneous flows, memory use is also a critical aspect of field extraction. Lastly, the complexity of writing field extractors is an important consideration, as this determines the rate at which new protocol field extractors can be deployed.

Tests are performed using two types of traces, HTTP and SOAP. We use HTTP traffic in our comparative tests because the majority of non-P2P traffic on the Internet is HTTP and because HTTP field extraction is critical for L7 load balancing. We use a SOAP-like protocol to demonstrate FlowSifter's ability to perform field extraction on flows with recursive structure. SOAP is a very common protocol for RPC in business applications, and SOAP is the successor of SML-RPC. Parsing SOAP at the firewall is important for detecting overflows of a particular parameter.

Our trace data form is interleaved packets from multiple flows. In contrast, previous work has used traces that consist of pre-assembled complete flows. We use the interleaved packet format because it is impractical for a network device to pre-assemble each flow before passing it to the parser. Specifically, the memory costs of this pre-assembly would be very large and the resulting delays in flow transmission would be unacceptably long.

Our HTTP packet data comes from the MIT Lincoln Labs (LL) DARPA intrusion detection data sets. This LL data set has 12 total weeks of data from 1998 and 1999. We obtained the HTTP packet data by pre-filtering for traffic on port 80 with elimination of TCP retransmissions and delaying out-of-order packets. Each day's traffic became one test case. We eliminated the unusually small (<25 MB) from our test data sets to improve timing accuracy. This left 45 test traces, with between 0.16 and 2.5 Gbit of data and between 27K and 566K packets per trace.

We generated 17 traces of SOAP-like flows by encapsulating a constructed SOAP body in a fixed HTTP and SOAP header and footer. Each trace is parametrized by n, the number of levels of recursive structure guaranteed to be built. We varied n from 0 to 16. The SOAP body was composed of nested tags, on level l, a child node was inserted with $(0.8^{max(0,l-n)})$ chance. After inserting a child node, the generator inserted a sibling node with $(0.6*0.8^{max(0,l-n)})$ chance. This produced a wide variety of recursive structures.

For each value of n, we generated 10 traces. For each trace, we generated 10,000 flows. These 10,000 artificial flows were turned into a multiplexed stream of packets or trace as follows. During each unit of virtual time, one new flow was added to the set of active flows. Then each active flow sent a random amount of its contents, with equal chances of sending 0, rand (50), rand (200), rand (1000) and 1000+rand (500) bytes. If the transmission amount for a flow exceeded its remaining content, that flow sent all remaining data and was then removed from the set of active flows. The data being sent in one unit of virtual time was then shuffled and accumulated into a virtual packet flow. On our 10,000 generated flows, this produced around 18K packets for n=0 and 106K packets for n=16.

An exemplary FlowSifter implementation was written in Objective CamI (excluding DFA generation) and runs on a desktop PC running Linux 2.6.35 on an AMD Phenom X4 945 with 4 GB RAM. It generates the CA from protocol and extraction grammars and simulates it on trace payloads.

We constructed HTTP field extractors using FlowSifter, BinPAC from version 1.5.1 of Bro, and UltraPAC from NetShield's SYN r1928. The basic method for field extractor construction with all three systems is identical. First, a base parser is constructed from an HTTP protocol grammar. Next, field extractor is constructed by compiling an extraction specification with the base parser. Each system provides its own method for melding a base parser with an extraction specification to construct a field extractor. We used UltraPAC's default HTTP field extractor which extracts the following HTTP fields: method, URI, header name, and header value. We modified BinPAC's default HTTP field extractor to extract these same fields by adding extraction actions. FlowSifter's base HTTP parser was written from the HTTP protocol spec. We then wrote an extraction specification to extract these same HTTP fields.

For SOAP traffic, we can only test FlowSifter. We again wrote a base SOAP parser using a simplified SOAP protocol spec. We then made an extraction specification to extract some specific SOAP fields and formed the SOAP field extraction by compiling the extraction specification with the base SOAP parser. We attempted to develop field extractions for BinPAC and UltraPAC, but they seem incapable of easily parsing xml-style recursive structures. BinPAC assumes it can buffer enough flow data to be able to generate a parse node at once. UltraPAC's Parsing State Machine can't represent the recursive structure of the stack, so it would require generating the counting approximation by hand.

For any trace, there are two basic metrics for measuring a field extractor's performance: parsing speed and memory used. We define a third metric, efficiency, which we define as the parsing speed divided by the $\log_{10}$ of the memory needed. High efficiency indicates higher speed with less memory needed.

We use the term speedup to indicate the ratio of FlowSifter's parsing speed on a trace divided by another field extractor's parsing speed on the same trace. We use the term memory compression to indicate the ratio of another parser's memory used on a trace divided by FlowSifter's memory used on the same trace. The average speedup or average memory compression of FlowSifter for a set of traces is the average of the speedups or memory compressions for each trace. Parser Complexity is measured by comparing the definitions of the base HTTP protocol papers. We could only compare the HTTP protocol parsers since we failed to construct SOAP field extractors for either BinPAC or UltraPAC.

We measure parsing speed as the number of bits parsed divided by the time spent parsing. We use Linux process counters to measure the user plus system time needed to parse a trace.

We measure the memory taken by a field extractor on a trace by measuring the memory use of the extractor before and right at the end of processing the given trace and taking the difference. BinPAC and UltraPAC use manual memory management, so we measure memory use by using tcmalloc's generic.current_allocated_bytes parameter. This allows us to precisely identify the exact amount of memory allocated to the extractor and not yet freed. Since FlowSifter runs in a garbage collected environment, its environment provides an equivalent measure of live heap data.

Figure 3A:
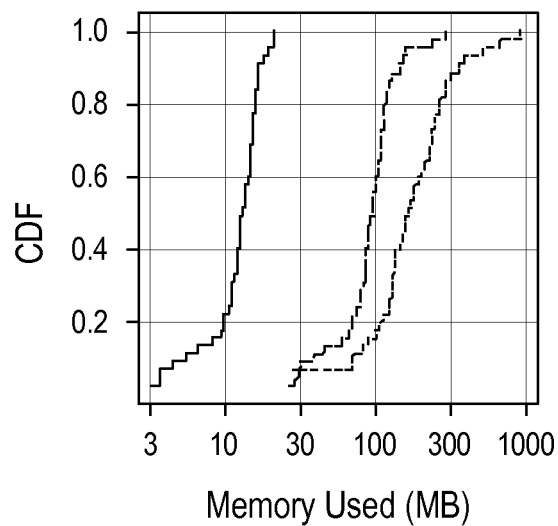
FIGS. 3A-3C are graphs illustrating cumulative distribution function comparisons for different field extractors.
Figure 3B:
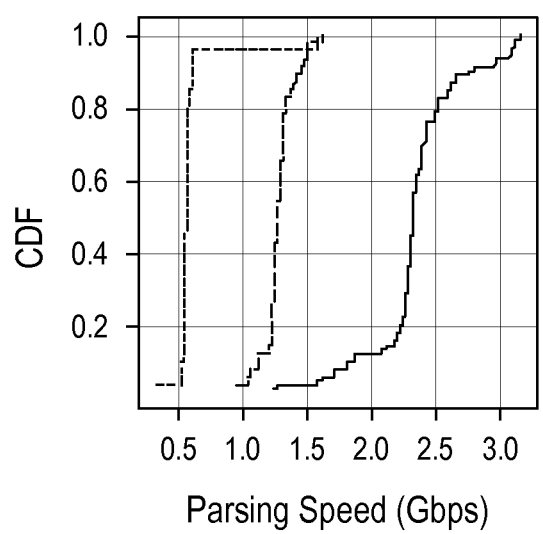
Figure 3C:
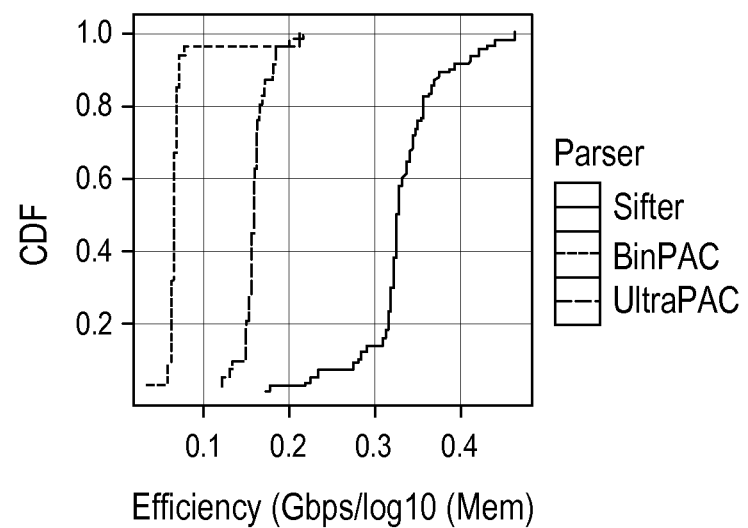

Empirical cumulative distribution functions (CDFs) for all three field extractors' memory usage, parsing speed and efficiency on the 45 Lincoln Labs traces in FIGS. 3A-3C. These show FlowSifter's memory use dominates both BinPAC or UltraPAC. There is slight overlap in parsing speed, but FlowSifter clearly has better best case, worst case and average speed than both BinPAC and UltraPAC. The efficiency curve nearly matches the speed curve, with FlowSifter having infrequent worst and best efficiency, and still showing much improvement over BinPAC and UltraPAC.

FlowSifter parses the input faster than either BinPAC or UltraPAC. On average, FlowSifter runs 4.1 times faster than BinPAC and 1.84 times faster than UltraPAC.

FlowSifter's optimal DFA parsing speed is 1.8 Gbps. We determined this by running a simple DFA on a simple input flow. As shown in FIG. 3B, FlowSifter can run both faster and slower than 1.8 Gbps. FlowSifter can traverse flows faster by using the CA to perform selective parsing. For example, for an HTTP flow, the CA can process the ContentLength field into a number and skip the entire body by ignoring that number of bytes from the input. BinPAC and UltraPAC improve their performance similarly through their &restofflow flag.

However, the CA introduces two factors that can lead to slower parsing: evaluating expressions and context switching. In our current implementation, both predicates and actions are interpreted. A more efficient implementation could compile these so they run at the speed of the processor. Each CA transition also leads to potentially a new DFA that will process the next piece of the flow. FlowSifter suffers a context switching cost with each such DFA change.

To test FlowSifter's approximation performance, we made a SOAP field extractor that extracts a single field two levels deep and then rant it on our 10 traces for each value of n ranging from 0 to 16. As expected, FlowSifter's SOAP field extractor had a slower parsing speed than FlowSifter's HTTP field extractor. There are two main reasons for the slowdown. First, there are fewer opportunities for selective parsing. For example, FlowSifter cannot skip any fields such as the HTTP body. Second, as the recursion level increases, the number of CA transitions per DFA transition increases. This causes FlowSifter to check and modify counters more often, slowing execution.

Figure 4:
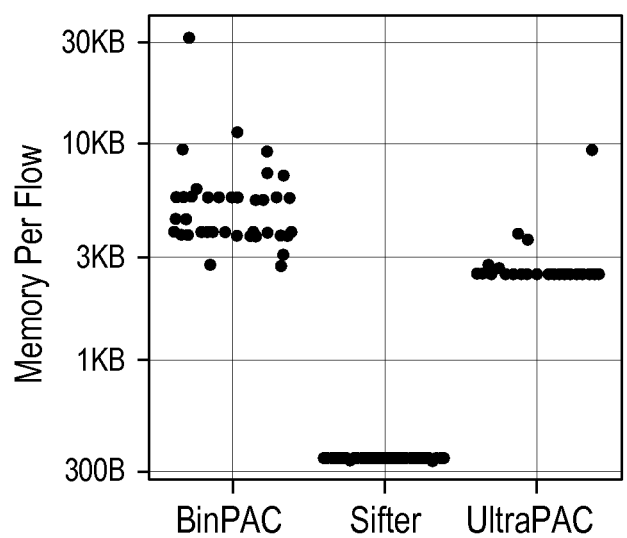
FIG. 4 is a graph illustrating total memory used by the different field extractors.

Each point in FIG. 4 shows the total memory used divided by the number of flows in progress when the capture was made. This shows FlowSifter uses much less memory per flow (and thus per trace) than either BinPAC or UltraPAC. On average over our 45 LL traces, FlowSifter uses 16 times less memory per flow (or trace) than BinPAC and 8 times less memory per flow (or trace) than UltraPAC.

FlowSifter's memory usage is consistently 344 bytes per flow. This is due to FlowSifter's use of a fixed-size array of counters to store almost all of the parsing state. BinPAC and UltraPAC use much more memory respectively averaging 5.5 KB and 2.7 KB per flow. This is mainly due to their buffering requirements, as they must parse an entire record at once. For HTTP traffic, this means an entire line must be buffered before they parse it. When matching a regular expression against flow content, if there is not enough flow to finish, they buffer additional content before trying to match again.

Figure 5:
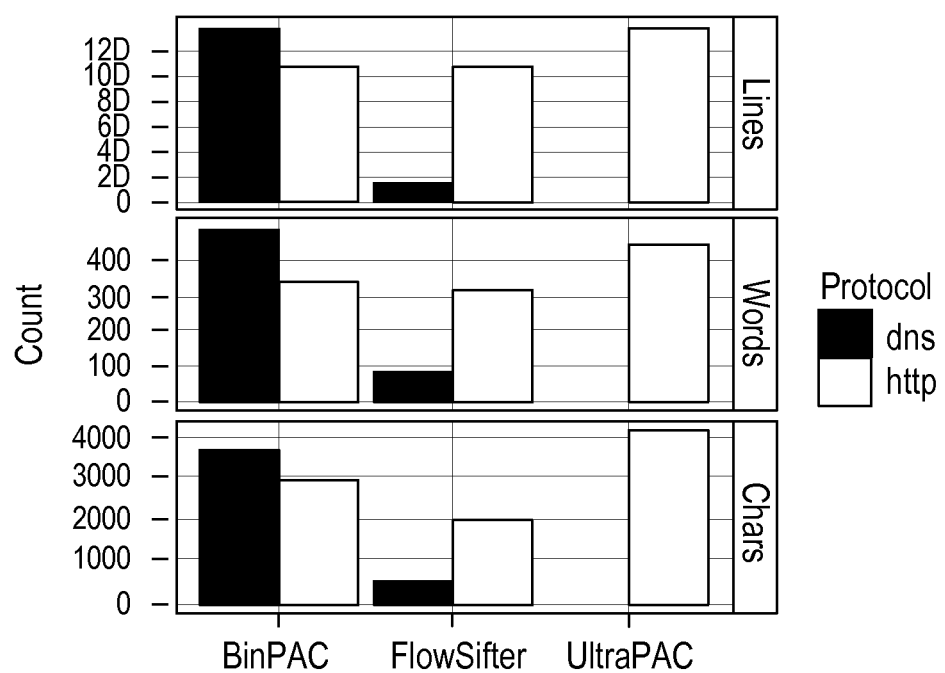
FIG. 5 is a chart illustrating the complexity of different field extractors.

The final point of comparison is less scientific than the others, but is relevant for practical use of parser generators. The complexity of writing a base protocol parser for each of these systems can be approximated by the size of the parser file. We exclude comments and blank lines for this comparison, but even doing this, the results should be taken as a very rough estimate of complexity. FIG. 5 shows a DNS and HTTP parser size for BinPAC and FlowSifter and HTTP parser size for UltraPAC. UltraPAC has not released a DNS parser. The FlowSifter parsers are the smallest of all three, with FlowSifter's DNS parser being especially small. This indicates that CCFG grammars are a good match for application protocol parsing.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

What is claimed is:

1. A computer-implemented system for application protocol field extraction, comprising:
an extraction specification that specifies data elements to be extracted from data packets and is expressed in terms of a context-free grammar, where the grammar defines grammatical structures of data packets transmitted in accordance with an application protocol and is defined as a tuple having nonterminals, terminals, counters, production rules and a start nonterminal, such that the counters are variables with an integer value used to chronicle parsing history of the production rules, and at least one of the production rules includes an action association with a terminal or nonterminal comprising body of the production rule and the action is an expression for updating a value of a counter defined by the grammar;
an automata generator configured to receive the extraction specification and generate a counting automaton; and
a field extractor configured to receive a data flow comprised of a plurality of data packets traversing through a network and extract data elements from the data packets in accordance with the counting automaton, where the field extractor is implemented by an integrated circuit.

2. The system of claim 1 wherein the production rules are in the form of <predicate>: <nonterminal>→<body>, such that the body is an ordered sequence of terminals and nonterminals and each predicate is expressed in terms of at least one counter.

3. The system of claim 1 further comprises a grammar optimizer configured to receive the extraction specification which is incomplete in relation to the context-free grammar and operable to translate the extraction specification to a complete extraction specification using the context-free grammar.

4. The system of claim 3 wherein the grammar optimizer transforms the complete extraction specification to an equivalent regular grammar.

5. The system of claim 3 wherein the grammar optimizer transforms the complete extraction specification by identifying production rules from the extraction specification having nonterminals as either normal or non-normal; replacing each of the production rules identified as normal with a regular rule using decomposition methods; approximating a regular rule for each of the production rules identified as non-normal; and concatenating the regular rules to form a regular grammar.

6. The system of claim 1 wherein the automata generator generates the counting automaton by setting an initial state of the counting automaton to the start nonterminal of the regular grammar; setting states of the counting automaton equal to set of nonterminals in the regular grammar; and, for each state, assigning transition functions by identifying a set of production rules having a head whose predicate is satisfied by each possible counter configuration and constructing a given state from regular expressions taken from the body of each rule in the identified set of productions rules, where the decision for the given state is corresponding action taken from the body of each rule in the identified set of production rules.

7. The method of claim 1 wherein the field extractor, for a given data packet, outputs location information for data elements contained in the data packet that satisfy one or more regular expression from the extraction specification.

8. A computer-implemented method for generating a counting automaton for use by a field extractor, comprising:
receiving an extraction specification that specifies data elements to be extracted from data packets and is expressed in terms of a context-free grammar, where the context-free grammar defines grammatical structures of data packets transmitted in accordance with an application protocol and is defined as a tuple having nonterminals, terminals, counters, production rules and a start nonterminal, such that the counters are variable with an integer value used to chronicle parsing history of the production rules and at least one of the production rules includes an action association with a terminal or nonterminal comprising body of the production rule and the action is an expression for updating a value of a counter defined by the grammar;
transforming the extraction specification to an equivalent regular grammar; and
generating a counting automaton from the regular grammar.

9. The method of claim 8 further comprises receiving an extraction specification that specifies data elements to be extracted from data packets but is incomplete in relation to the context-free grammar and translating the incomplete extraction specification to a complete extraction specification using the context-free grammar.

10. The method of claim 8 wherein the production rules are in the form of <predicate>: <nonterminal>→<body>, such that the body is an ordered sequence of terminals and nonterminals and each predicate is expressed in terms of at least one counter.

11. The method of claim 8 wherein transforming the extraction specification further comprises
identifying production rules from the extraction specification having nonterminals as either normal or non-normal;
replacing each of the production rules identified as normal with a regular rule using decomposition methods;
approximating a regular rule for each of the production rules identified as non-normal; and
concatenating the regular rules to form a regular grammar.

12. The method of claim 11 wherein identifying production rules further comprises classifying a production rule as normal when the production rule is regular or, for production rules having a given nonterminal, X, as its head, the given nonterminal is a last symbol in a body of the production rule and, for every nonterminal, Y, that is reachable from the given nonterminal, Y is normal and the given nonterminal, X, is not reachable from Y.

13. The method of claim 12 wherein approximating a regular rule further comprises identifying start and end terminals for a given production rule, X, identified as non-normal and replacing the given production rule, X, with the following rules $$(cnt=0): X \rightarrow \epsilon$$

$$(cnt \geq 0): X \rightarrow start(cnt:=cnt+1)\ X$$

$$(cnt > 0): X \rightarrow stop(cnt:=cnt-1)\ X$$

$$(cnt > 0): X \rightarrow other\ X$$

where X is the given production rule identified as non-normal, the cnt is a new counter, start is a start terminal, end is a end terminal and the remaining terminals are denoted by other.

14. The method of claim 11 further comprises eliminating any of the regular rules without terminal symbols from the regular grammar.

15. The method of claim 8 wherein generating a counting automaton further comprises setting an initial state of the counting automaton to the start nonterminal of the regular grammar; setting states of the counting automaton equal to set of nonterminals in the regular grammar; and, for each state, assigning transition functions by identifying a set of production rules having a head whose predicate is satisfied by each possible counter configuration and constructing a given state from regular expressions taken from the body of each rule in the identified set of productions rules, where the decision for the given state is corresponding action taken from the body of each rule in the identified set of production rules.

16. A computer-implemented method for generating a counting automaton for use by a field extractor, comprising:
receiving an extraction specification that specifies data elements to be extracted from data packets and is expressed in terms of a context-free grammar, where the context-free grammar defines grammatical structures of data packets transmitted in accordance with an application protocol and the context-free grammar is defined as a tuple having nonterminals, terminals, counters, production rules and a start nonterminal, such that the counters are used to chronicle parsing history of the production rules;
transforming the extraction specification to an equivalent regular grammar, wherein transforming the extraction specification further comprises
identifying production rules from the extraction specification having nonterminals as either normal or non-normal;
replacing each of the production rules identified as normal with a regular rule using decomposition methods;
approximating a regular rule for each of the production rules identified as non-normal; and concatenating the regular rules to form a regular grammar; and generating a counting automaton from the regular grammar.

\* \* \* \* \*